(12) United States Patent
Saitoh

(10) Patent No.: US 8,678,749 B2
(45) Date of Patent: Mar. 25, 2014

(54) CENTRIFUGAL REVERSE FLOW DISK TURBINE AND METHOD TO OBTAIN ROTATIONAL POWER THEREBY

(76) Inventor: Takeo S. Saitoh, Sendai (JP)

(*) Notice: Subject to any disclaimer, the term of this patent is extended or adjusted under 35 U.S.C. 154(b) by 1116 days.

(21) Appl. No.: 12/654,830

(22) Filed: Jan. 5, 2010

(65) Prior Publication Data

US 2011/0164958 A1 Jul. 7, 2011

(51) Int. Cl.
 *F01D 1/36* (2006.01)
(52) U.S. Cl.
 USPC .......................................... 415/90; 416/20 R
(58) Field of Classification Search
 USPC .......... 415/90, 80, 81, 82, 85, 88, 203; 416/4, 416/20 R
 See application file for complete search history.

(56) References Cited

U.S. PATENT DOCUMENTS

| 1,061,142 A | 5/1913 | Tesla |
| 1,061,206 A | 5/1913 | Tesla |
| 2009/0220329 A1* | 9/2009 | Pickard ............................ 415/1 |

FOREIGN PATENT DOCUMENTS

| JP | 2004-278335 | 10/2004 |
| JP | 2005-188378 | 7/2005 |

* cited by examiner

*Primary Examiner* — Dwayne J White
(74) *Attorney, Agent, or Firm* — McGinn Intellectual Property Law Group, PLLC

(57) ABSTRACT

A centrifugal reverse flow disk turbine for power generation, comprising; a) a turbine shaft; b) a disk rotor disposed on said turbine shaft; c) a housing, having said turbine shaft and said disk rotor, bearings, seal devices, and at least one jet nozzle means; d) a plurality of radially engraved channel for transporting working fluid from entering ports, placed axially near said turbine shaft; e) a plurality of said channels having two curvatures; first curvature has a small radius, and concaved pertinent to rotational direction of said rotor, starting from the entering port to middle of its flow path, and the second curvature has a large radius, convexed pertinent to rotational direction of said rotor, positioned near the peripheral of said rotor; a plurality of a bucket attached at every flow channel, directing against nozzle disposed on said housing, thereby deriving impinging counter supersonic flow.

20 Claims, 22 Drawing Sheets

LOGARITHMIC SPIRAL

ARCHIMEDES' SPIRAL

PARABOLIC SPIRAL

HYPERBOLIC SPIRAL

EPITROCHOID

INVOLUTE

CATENARY

INVOLUTE OF CATENARY

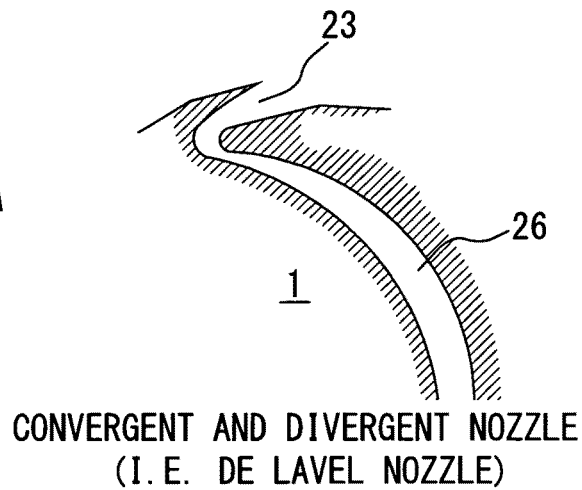
CONVERGENT AND DIVERGENT NOZZLE
(I.E. DE LAVEL NOZZLE)
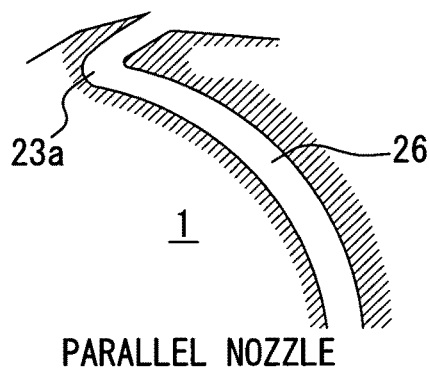
PARALLEL NOZZLE
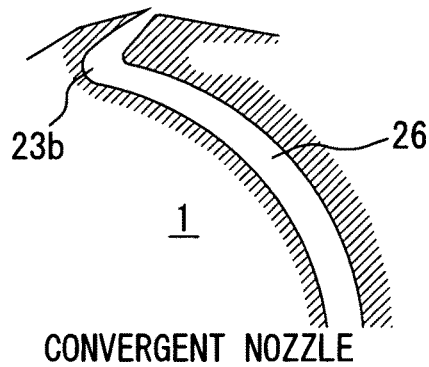
CONVERGENT NOZZLE

NASA 10KW MICRO GAS TURBINE ENGINE
FOR SPACE APPLICATION

CENTRIFUGAL REVERSE FLOW DISK TURBINE AND METHOD TO OBTAIN ROTATIONAL POWER THEREBY

BACKGROUND OF THE INVENTION

1. Field of the Invention

This invention in general relates to a prime mover based upon a centrifugal reverse flow disk turbine, which is applicable to steam, gas, water, and air turbines, and a method to yield a rotational power thereby.

2. Related Art

In conventional turbines, which have been operated in fossil and nuclear power plants, for example, large-scale steam (water) turbines more than one gigawatt (GW) under a supercritical condition are utilized in order to minimize the steam rate and to improve the thermal efficiency thereof.

However, it is estimated that these fossil and nuclear fuels on the earth would run out at end of this century as clearly projected in FIG. 11. FIG. 11 includes all kind of energy resources on the earth, i.e. fossil fuels (oil, coal, and natural gas), and nuclear fuel, as well as methane hydrate therewith.

Another crucial issue human beings are now facing with is global warming due to carbon dioxide ($CO_2$) emissions into earth's thin planetary boundary layer, mainly caused by combustion of fossil fuels as mentioned above. The British government's chief scientific adviser, Sir David King, has described global warming as a greater threat than terrorism. (The Japan Times, Feb. 4, 2005)

According to a recent super-computer projection (Saitoh and Wakashima, Green Life, Mar. 2006), as indicated in FIG. 10, the $CO_2$ concentration in the atmosphere will increase to 1250 ppmv within 100~200 years as in FIG. 12. What is the most outstanding feature of our simulations is that after taking a maximum, the $CO_2$ concentration will stay almost constant during 50000 years thereafter.

While, urban environment in mega-cities like Tokyo is still getting worse and worse. For example, the concentration of $NO_2$ is still increasing and above a regulated level in the Tokyo metropolitan area. The cause of aggravation of the urban environment can be mainly attributed to increase of automobiles in the urban area. This serious environmental issue is called "urban warming (or heat island)", which is caused by a concentrated consumption of energy in the urban area.

These two major restrictions oblige human to change their life styles and use renewable energies including solar, wind, ocean, geothermal, and biomass, other than fossil fuels.

However, the renewable energy is dispersed and attainable temperature and pressure are sometimes low, thereby leading to a down-sized prime mover. This down-sizing brings conventional turbine a great aggravation of thermal efficiency illustrated clearly in FIG. 13.

Further, multi-staging and reheating/regenerating cycles, which have been very common in conventional large-steam turbines could not be exploited in a small turbine because of a strict cost limitation.

A typical conventional large-scale steam turbine is of axial flow one having three-dimensional static and moving blades mounted on the housing and the rotor, respectively. The working fluid (for ex. water steam), in general, flows axially, so that the physical properties of steam may considerably change on its way to the last stage, thereby bringing the rotor diameter variation.

This causes complicatedness and high cost of a entire system (about 100~500 times higher than conventional gasoline engine and the same power rated engines). This fact greatly hinders market permeation of the small-sized turbines.

In above-mentioned large-scale steam turbines, a supercritical condition (a condition exceeding pressure: 22.12 MPa, and temperature: 375.15 degree Celsius for water vapor) was adopted to raise its thermal efficiency. Nonetheless, the thermal efficiency of even the latest most advanced fossil-powered steam turbine is at most 40~42%, this value being only 60% of the ideal Carnot cycle efficiency.

If the conventional steam turbine were down-sized to 10 kW, say, the thermal efficiency would be reduced to only 3~5%, which is by far less than average photovoltaic cell efficiency (about 10%; annual mean).

[Tesla's Pioneering Works on Bladeless Disk Turbine]

Nikola Tesla (1857-1943), who was a US electric engineer, known as an inventor of induction motor, alternating current, Tesla coil, and magnifying transmitter, etc., conducted an intensive work on his Tesla bladeless turbine during the period from 1908 to 1930. Examples of his invention are seen in many prior art patents, including U.S. Pat. No. 1,061,142 and U.S. Pat. No. 1,061,206.

In the disk turbine, which bears his name, the rotor is composed of a plurality of flat plates which are set in motion through the adhesive and viscous action of the working fluid, entering the system tangentially at the periphery and leaving it at the center. At that time, the Tesla's turbine was spotlighted as a thermodynamic transformer of an actively surprising by far that of any other prime mover theretofore.

Around 1910, Tesla built his 200 horsepower turbine with rotor diameter of 18 inches, which turned at a speed of 9000 revolutions per minute. This turbine was situated in the Waterside Station, the main powerhouse of the New York Edison Company.

However, at his time, the trend was rapidly changing toward another type of turbines; i.e. Parsons and Curtis turbines, these were well entrenched in the development stage. As the history shows, these axial flow turbines have swept over the world thereafter. Tesla was a late starter. Had Tesla advanced with the development of his turbine as early as 1889 when he returned from the Westinghouse plant, the Tesla turbine might perhaps have been completed. This was really a turning point for the Tesla turbine.

However, mankind is now facing an unprecedented environmental age; namely, global warming due to $CO_2$ emissions, urban warming due to heat emissions in city area, exhaustion of fossil and nuclear fuels, problems of population growth, food production, drinking water scarcity, and other resources. In order to resolve all crucial issues stated above, exploitation of renewable energies such as solar, wind, geothermal, ocean thermal, biomass, various kinds of temperature differences etc. is inevitable and some of those have been partly introduced in the market. A Green New Deal Plan also comes up with by the Obama cabinet, last year.

With a tailwind of time and recent advancement of materials, and cutting-edge manufacturing technology, and computer simulation technique, as well as numerical methods involved, a sophisticated and highly-advanced version of Tesla turbine is brought back to life in a long absence of 100 years. In this sense, Tesla was a prodigal genius who dreamed and projected the future.

Advanced technologies such as multi-staging and reheating/regenerating cycles, which have been very common in conventional large-steam turbines, could not be exploited anymore in a small turbine because of a strict cost limitation. Instead, the present invention based on Tesla turbine having the great advantages of i) simplicity of design, ii) low noise and vibration level, iii) stability in operation, easy maintenance, iv) economies of construction, and lastly, v) very high-efficiency will reign over the world in the 21$^{st}$ century.

It is especially noted here that without Tesla's pathfinding and profound original works, the present invention could not be accomplished at all.

As an important measure for evaluating all kinds on prime movers which will appear in the 21$^{st}$ century, the most appropriate one will be the Carnot efficiency ratio (abbreviated as CER thereafter), this being a ratio of the real prime mover (engine) against the Carnot efficiency, that implies a maximum attainable limit among all kinds of prime movers ever appeared in the history or will appear in the future.

The Carnot efficiency ratios for typical engines and prime movers are illustratively plotted in FIG. 13, including Gasoline engine (TOYOTA Prius), Diesel engine, Gas turbine, Steam turbine, Scroll engine, Gas engine, Vane-type engine, Stirling engine, and recent Fuel cell. It is again noted that the thermal efficiency is about twice better than conventional gasoline engine (see Prius in FIG. 13).

[Prius]

Since the great invention of gasoline-powered vehicle by Gottlieb Daimler and Karl Benz, almost simultaneously, in 1886, the gasoline engines have been widely accepted and swept over the whole world more than a century. Further, those engines are still dominating the world.

Although its reliability and cost effectiveness are overwhelming, efforts toward an improvement of the thermal efficiency of the gasoline engine is strictly limited owing to an old cycle of the engine, i.e. the Otto cycle. This engine could not survive any more in the environment-compatible 21$^{st}$ century.

Evaluating the Prius (first manufactured in 1997 by TOYOTA) which has the best thermal efficiency (as a gasoline engine vehicle) in the world, one can judge whether the Prius would be earth-compatible or not. For example, the Carnot efficiency ratio (CER) of the Prius is only 0.44, thereby indicating a low compatibility against the environment.

Spencer Abraham, who was the Administrator of Energy Agency of Clinton Cabinet, estimated that the number of cars in 2050 would be 3.5 Billions. If this projection were true, and the business would go as usual, the energy consumption by cars would amount to about 9 TW (terawatts), this being more than a half of the current consumptions.

The Prius can curtail the fuel consumption to a half, however, this is not sufficient to mitigate global warming at all, since the energy consumption by cars will exceeds 16 TW even if all vehicles were replaced with the hybrids equivalent with the Prius.

[Fuel Cell]

As a next generation prime mover, fuel cell has been spotlighted and many automobile manufacturers placed much attention upon this promising future technology.

However, the fuel cell has three major crucial problems, which can not be solved easily; one is the energy resource. The fuel cell uses gaseous hydrogen, but hydrogen does not exist in nature as it is. It must be reformed from existing fossil fuels or by virtue of electrolysis from water by utilizing electricity via e.g. photovoltaic cell which is a carbon-free energy source. However, total transforming efficiency of solar to hydrogen route is very low, say, 3~5% at maximum.

Secondly, the energy transforming efficiency of the fuel cell is relatively low; a theoretical efficiency reaches over 50%, but the auxiliary power needs at least 7% of generated electricity, thereby reducing the net power from the fuel cell. Current efficiency is around 40%, which is almost equal to the Prius' efficiency.

Lastly, life expectancy and cost itself; since the fuel cell involves a chemical reaction process, degradation such as membrane is inevitable, thereby reducing its life expectancy. Also considered as another crucial barrier is its cost.

It will take a long time period (more than 30~50 years) to resolve three problems mentioned above.

[Stirling Engine]

Stirling engine, invented in 1816 by Robert Stirling who was a Scotland engineer, was once regarded as a promising prime mover in 1980's. In early times of development, the Stirling engine was considered to work at a low temperature difference, which is appropriate for solar applications.

However, at present, the Stirling engine can operate efficiently only for a high-temperature range above 700~800 degree Celsius. Further, its thermal efficiency is not sufficient.

[FORD Organic Rankine Cycle Turbine]

From 1976 to 1984, a Solar Thermal Power System Project was conducted by the Jet Propulsion Laboratory (JPL). Ford Aerospace and Communications Corporation designed and assembled the organic Rankine cycle turbine, which was the first tentative Rankine cycle and a pioneering work toward an epoch-making prime mover (Leonard D. Jaffe, J. of Solar Energy Engineering, Vol. 110, November 1988, pp. 275-281). As an expander, a radial turbine of single stage impulse type was adopted and toluene was used for the working fluid to cover a high temperature range.

Although the turbine adopted was the conventional radial turbine, they obtained the maximum conversion efficiency of 23 percent and the output power of 21.6 kW with the Carnot efficiency ratio being 44 percent.

This project was indeed very valuable one since it was done as early as 1970's and the validity of organic Rankine cycle was first recognized. If the present invention were incorporated in that project, the vehicle mileage would be at least twice better than the Prius; i.e. 89.4 mpg (or 76 km/l).

[Photovoltaic Cell]

Photovoltaic cell (PV) was first introduced as early as 1950's in US Space program. It has over 50 years history, but the generation efficiency for electricity is still as low as only 10 percent on yearly averaged base. PV is promising technology among solar electricity generation devices. However, there are some barrier in dissemination of PV systems. One is relatively low efficiency and another high cost.

Moreover, the PV can not be used as a bottoming cycle and it needs a battery for energy storage, thereby restricting vulnerability.

[NASA Micro-Gas Turbine]

A micro-gas turbine for use in space was developed by NASA, schematically shown in FIG. 14. The turbine includes solar receiver, waste heat radiator, regenerator (heat exchanger), compressor, generator, and turbine expander. The output power is 10 kW at 36000 rpm, under inlet temperature of 1144K. According to NASA, its thermal efficiency is reported to be 29%, which indicates that the CER (Carnot efficiency ratio) is only 0.39.

[Previous Off-Centered Design Disk Turbine]

A disk turbine with reverse direction channel flow, which is different from the present invention, is described in Japanese patent application laid-open disclosure number 2004-278335 and 2005-188378. A typical experimental result was designated in FIG. 15, showing output power versus speed of rotation. It is quite noteworthy that a stall phenomenon clearly appears after taking its maximum power around 3500 rpm. An abrupt decrease of power is seen, thereby causing a dead output at early rotational speed of 5000 rpm as indicated in FIG. 15. This stall phenomenon is of crucial importance since the thermal efficiency is restricted thereby.

Power due to the viscous force in the above case is proportional to 2.5 power to angular velocity of rotation (ω), so that viscous power loss increases abruptly with rotational speed.

This fatal disadvantage was brought about owing to off-centered design concept itself. Further, there existed a Joule-Thomson effect, which appears in tip clearance region between the housing and the rotor tip.

[Steam Turbine in Power Plants]

FIG. 16 shows the relation between a power rating and a specific steam rate for a steam turbine in power plants, etc., wherein an ordinate indicates the steam rate (kg/h) for generating a power of 1 kW. In this graph, it is seen that the higher the performance of the steam turbine becomes, the lower the steam rate, and this implies the reason why the steam rate in a giant power plant such as a power rate of 1,000,000 kW is low. On the other hand, it is understood in the graph that the efficiency becomes worse in a micro steam turbine of 1 to 100 kW by one tenth.

It is considered that this is resulted from the fact that a flow through (useless flow; not contributing to the power) which flows through tip clearances around a periphery of a rotor, blades, and so on becomes large. In addition, heat transfer and friction loss at wall per unit flow rate are increased to extremely lower an efficiency, together with a surface area per unit flow is large.

SUMMARY OF THE INVENTION

It is an object of the invention to provide an improved down-sized centrifugal reverse flow disk turbine.

Another object of the invention is to provide an improved down-sized centrifugal reverse flow disk turbine having a low steam rate and a high thermal efficiency.

Further object of the invention is to provide an improved down-sized centrifugal reverse flow disk turbine with high cost performance.

The present invention provides a centrifugal reverse flow disk turbine for power generation, comprising; a) a turbine shaft; b) a disk rotor disposed on said turbine shaft; c) a housing, having said turbine shaft and said disk rotor, bearings, seal devices, and at least one jet nozzle means; d) a plurality of radially engraved channel for transporting working fluid from entering ports, placed axially near said turbine shaft; e) plurality of said channels having two curvatures; first curvature has a small radius, and concaved pertinent to rotational direction of said rotor, starting from the entering port to middle of its flow path, and the second curvature has a large radius, convexed pertinent to rotational direction of said rotor, positioned near the peripheral of said rotor; a plurality of a bucket attached at every flow channel, directing against nozzle disposed on said housing, thereby deriving impinging counter supersonic flow.

Also, the present invention provides a method for earning rotational power using said centrifugal reverse flow disk turbine described above, including: a) an impulse force coming from impinging supersonic flows from jets out of nozzles disposed on said housing; b) a reaction force coming from impinging supersonic flows from jets out of nozzles disposed on said housing; c) a force due to counter supersonic flow which arises when two jets, one from fixed nozzle disposed on said housing, and another from rotating blade disk rotor, impinge each other at the prescribed locations; d) a thrust exerted by jet flow from rotating blade disk rotor, which is effective only when the nozzle ejection velocity exceeds the peripheral velocity of rotation; e) a force due to change of momentum at the second curvature of the flow channel; f) a viscous force produced at both walls in a narrow gap between two plain disks, due to radial and the same directional flow as rotation of rotor.

Furthermore, the present invention provides a turbine structure, comprising: a rotor mounted on a shaft, the rotor having a channel for flowing working fluid; a housing for rotationally supporting the shaft to accommodate the rotor in an interior space thereof; and at least one nozzle for ejecting the working fluid to the interior space of the housing at a supersonic velocity, at least one nozzle being provided on an inner wall of the interior space; wherein the rotor is rotated at a first predetermined velocity by receiving the working fluid at a first end portion of the channel, so that the working fluid flows through the channel in the first direction, and the rotor is rotated at a second predetermined velocity higher than the first predetermined velocity by receiving the working fluid from a second end portion of the channel, so that the working fluid flows through the channel in a second direction opposite to the first direction to produce a counter supersonic flow force.

BRIEF DESCRIPTION OF THE DRAWINGS

Next, preferred embodiments according to the invention will be explained in conjunction with appended drawings:

FIG. 5A is a cross sectional view of a convergent and divergent nozzle.

FIG. 5B is a cross sectional view of a parallel shaped nozzle.

FIG. 5C is a cross sectional view of a convergent nozzle.

DETAILED DESCRIPTION OF THE PREFERRED EMBODIMENTS

Figure 1A:
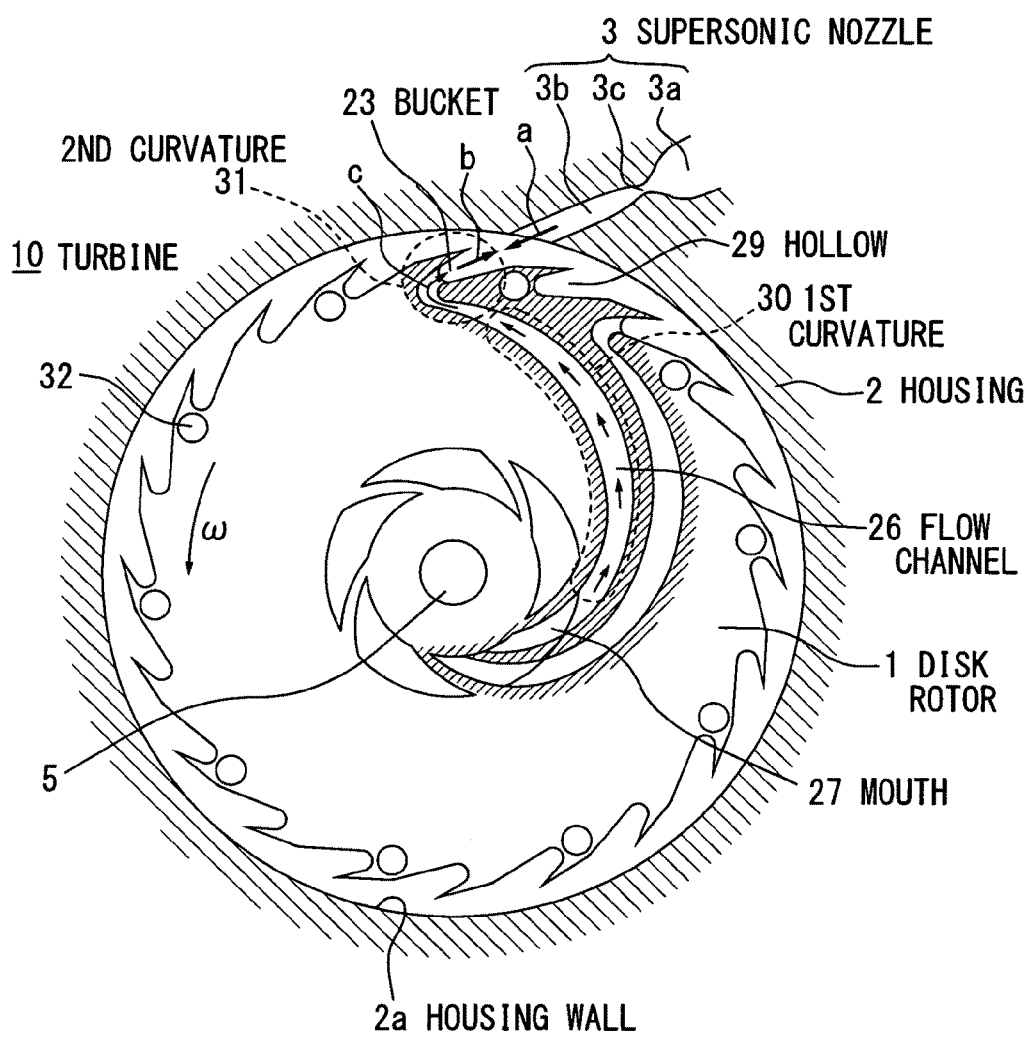
FIG. 1A is a partial cross sectional view for explaining the operation of the centrifugal reverse flow disk turbine.

Best Mode for Carrying Out the Invention

[Operation]

The working principle of the invention will be explained by virtue of FIG. 1A and FIG. 1B, in which only a part of flow channels formed inside the disk rotor is depicted.

In a centrifugal reverse flow disk turbine, when the rotational speed of the rotor is small, the jet ejected from the nozzle 3 disposed on the housing wall flows inwardly along the radial channel 26 after impinging the bucket (cusp) 23 of the rotor. Namely, since the inlet pressure $P_1$ of the working fluid is higher than the outlet pressure $P_2$, a pressure difference $\Delta P(=P_1-P_2)$ causes this radially-inward flow (Pressure effect) as shown in FIG. 1B.

Under this range of low speed of rotation, the peripheral rotor velocity $u_r(=R\omega$, R: rotor radius, $\omega$: angular velocity of rotation) is much smaller than the ejection velocity $u_j$, and the energy transforming efficiency is reduced to a great extent. On the other hand, if the speed of rotation were increased further, the flow direction in the flow channel 26 may be reversed owing to body force (i.e. centrifugal force), from inward to outward as shown in FIG. 1A. In FIG. 1A, the reference letter "a" shows an inward jet flow ejected from the nozzle 3, the reference letter "b" shows an outward flow caused by the centrifugal force and the reference letter "c" shows a centrifugal reverse flow in the channel 26. Thus, there exists a tipping point (or critical point), where the channel flow phenomena is drastically reversed.

The critical rotational speed of the rotor in the present centrifugal reverse flow disk turbine above which the centrifugal effect becomes dominant, is provided by solving the following equation (1);

$$\text{Tesla-Saitoh number} = TS = \frac{Re}{Fe} = \frac{\frac{R^2\omega}{v}}{\frac{\Delta P}{\mu\omega}} > \frac{2}{f_1(a, A, R, \beta, \phi)} \quad (1)$$

where, $$TS: \text{Tesla-Saitoh number} = \frac{Re}{Fe}$$

$$Re: \text{Reynolds number} = \frac{R^2\omega}{v}$$

$$Fe: \text{Flow energy number} = \frac{\Delta P}{\mu\omega}$$

R: rotor radius
$\Delta P$: pressure difference between at tip clearance and inlet near rotor shaft
$\omega$: angular velocity of rotation
v: kinematic viscosity of working fluid
A, $\beta$, $\phi$: parameters determined by given geometry of flow channel
a: starting radius of logarithmic spiral $$\beta: \frac{S_2}{R} (S_2: \text{length of flow channel})$$

In the previous equation (1), centrifugal driving is initiated when the Tesla-Saitoh number exceeds a value 2.915 in case that flow channel geometry obeys a logarithmic spiral;

$$r = a \cdot e^{p'\theta} \quad (2)$$

here,
a: starting radius of logarithmic spiral
$\theta$: angle measured from start line
r: radius If typical physical properties were given (in this example, one of Hydro Fluoro Carbons: HFC is selected as a working fluid) and R=0.05 m, $\beta$=2, $\phi$=60°, A=$\sqrt{(1+p'^2)}/p'$=3.333, and N=40, the critical speed of rotation n can be calculated to be;

$$n = 10310 \text{ rpm}$$

If the speed of rotation exceeds this critical value, the present centrifugal disk turbine will be operated under a centrifugal mode. The optimal speed of rotation is approximately 12000 rpm for previously given conditions.

On the other hand, the optimal speed of rotation for a pressure effect mode is about 6100 rpm, which is much lower than that for a centrifugal mode. In the present centrifugal driving mode, the following six kinds of forces can be utilized to gain rotational power, thereby greatly contributing to a high efficient use of incoming kinetic energy from the nozzle.

(a) $P_{imp}$: Impulse Force
The force exerted on the disk rotor when the supersonic jet flow from the nozzle 3 impinges bucket 23 and hollow 29.

(b) $P_{reac}$: Reaction Force
The force exerted on the disk rotor due to a rebound flow (reaction flow), which is formed after the supersonic jet flow from the nozzle 3 impinges the bottom of the bucket 23 and the hollow 29.

Figure 1B:
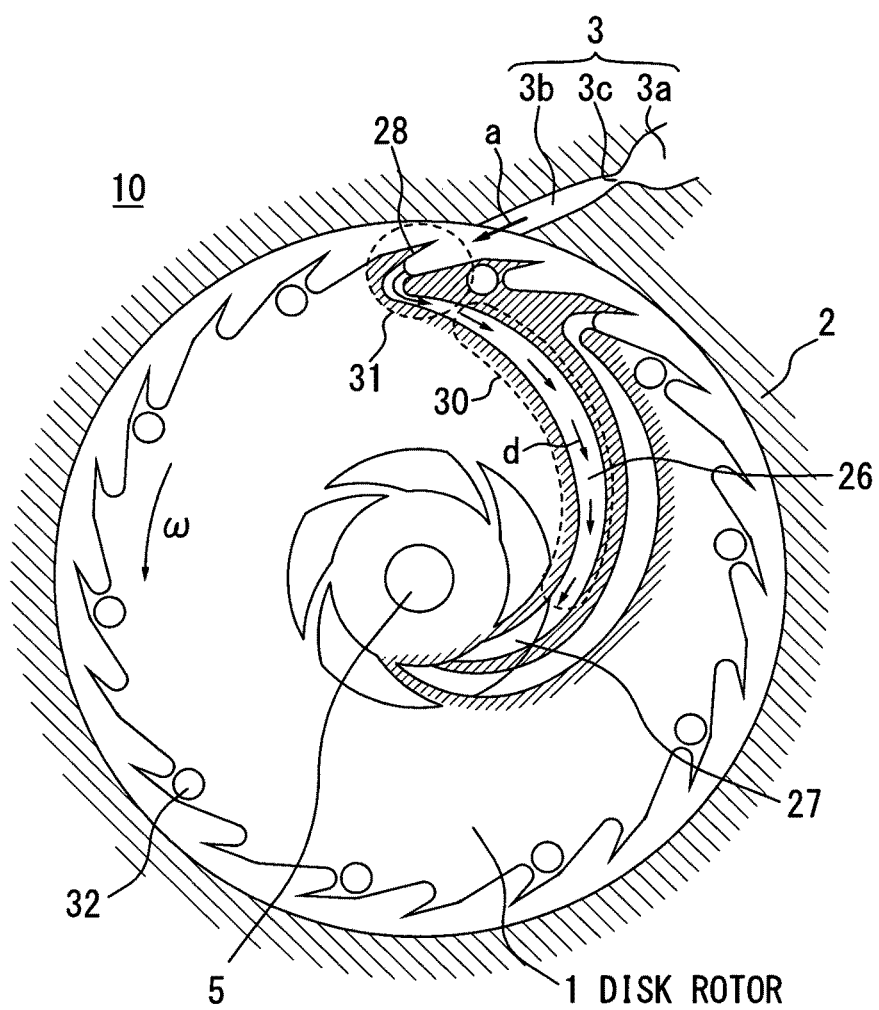
FIG. 1B is a partial cross sectional view for explaining the operation of the turbine, when the rotational speed is low.

Thus, two kinds of forces appear when the jet flow impinges the bucket shown in FIG. 1A.

The sum of the two forces is expressed by the following equation;

$$P_{imp} + P_{reac} = \dot{m}^* u_j^2 \alpha r(1-r) \quad (3)$$

here,
$\dot{m}^*$: mass flow rate of the working fluid
$u_j$: jet velocity from the nozzle
$\alpha$: coefficient
r: $u_r/u_j$=$R\omega/u_j$ (R: radius, $\omega$: angular velocity)

(c) $P_{csf}$: Counter Supersonic Flow Force

The working fluid entering from an axial mouth 27 is conveyed due to a centrifugal force to the bucket 23 at peripheral of the rotor, and ejected in the opposite direction to the rotation of the rotor. This outward flow brings a counter supersonic flow with the jet from the nozzle fixed to the housing. As a result, $P_{csf}$ has a similar effect as an impulse force, thereby increasing the rotational power. The counter supersonic flow effect is evaluated by the following equation;

$$P_{csf} = \dot{m} * u_j^2 \alpha r \cdot r_{csf} \quad (4)$$

here,
$r_{csf}$: velocity ratio due to counter supersonic flows (d) $P_{th}$: Thrust The working fluid entrained from the axial mouth 27 is transported due to a centrifugal effect to the bucket 23 at peripheral of the rotor, and ejected into tip clearance space. If this injection velocity is larger than the rotor tip speed $u_R (=R\omega)$, the thrust is produced, which is expressed by the following equation;

$$P_{th} = \dot{m} * u_R (\bar{v}_r - u_R) \quad (5)$$

here,
$\bar{v}_r$: ejection velocity from the bucket 23
$u_R$: rotor tip speed (e) $P_{vis}$: Viscous Force The torque force in the rotational direction exerted by a viscous (friction) effect which is generated when the working fluid entrained from the axial mouth 27 passes through a narrow-spaced flow channel 26. This force is available when the first curvature 30 has a concaved geometric configuration opposite to the direction of rotation. The viscous force $P_{vis}$ is designated by the following equation;

$$P_{vis} = \frac{\pi}{4} G'(0) N \mu \omega^2 R^3 \sqrt{Re} \quad (6)$$

here,
Re: Reynolds number
R: radius of the rotor
$\omega$: angular velocity of rotation
$\mu$: viscosity
N: number of blade disk The above equation gives an important relationship to clarify the mechanism of the invention. In equation (6), $G'(0)$ means the velocity gradient at the wall of the flow channel, and its value is obtained by solving the relevant partial differential equations to be $G'(0)=0.6160$.

(f) $P_{mc}$: Momentum Change Force

This force is generated at the second curvature 31 of the flow channel 26 when the direction of the flow turns abruptly, thereby changing its momentum $M(=mv$, m: mass, v: velocity). The force due to momentum change is given by the following equation;

$$P_{mc} = R\omega \frac{dM}{dt} \quad (7)$$

here,
M: momentum
t: time
$\omega$: angular velocity of rotation

In conventional large-scale steam power plants of 1 GW (gigawatt) class, including fossil and nuclear powered, obtainable forces are only two kinds; (a) impulse force, and (b) reaction force, which are available under a supersonic flow from the nozzle. On the other hand, in the present invention, six kinds of forces and effects can be exploited as mentioned before. Further, whereas the conventional large-scale steam turbines use the water vapor ($H_2O$) as a working fluid, the invention uses a working fluid with very low kinematic viscosity (about two order of magnitude smaller than the water vapor).

This is of crucial importance in the present invention since the boundary layer near the spacer disk gets very thin, thereby making radially-outward viscous flow eminent even if the disk spacing is very narrow (for example, 100 micron meters). This also contributes to a highest possible power density and a lowest cost of the invention compared with the conventional prime movers. As a result, Carnot efficiency ratio (CER) of the invention reaches about 90%.

Best Mode for Carrying out the Invention

Figure 2B:
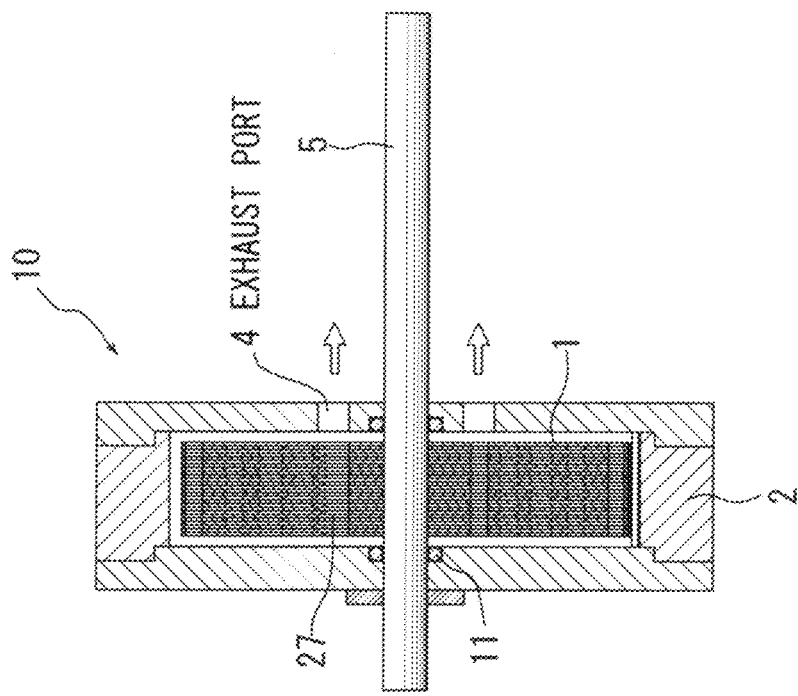
FIG. 2B is a parallel sectional view showing the centrifugal reverse flow disk turbine.
Figure 2A:
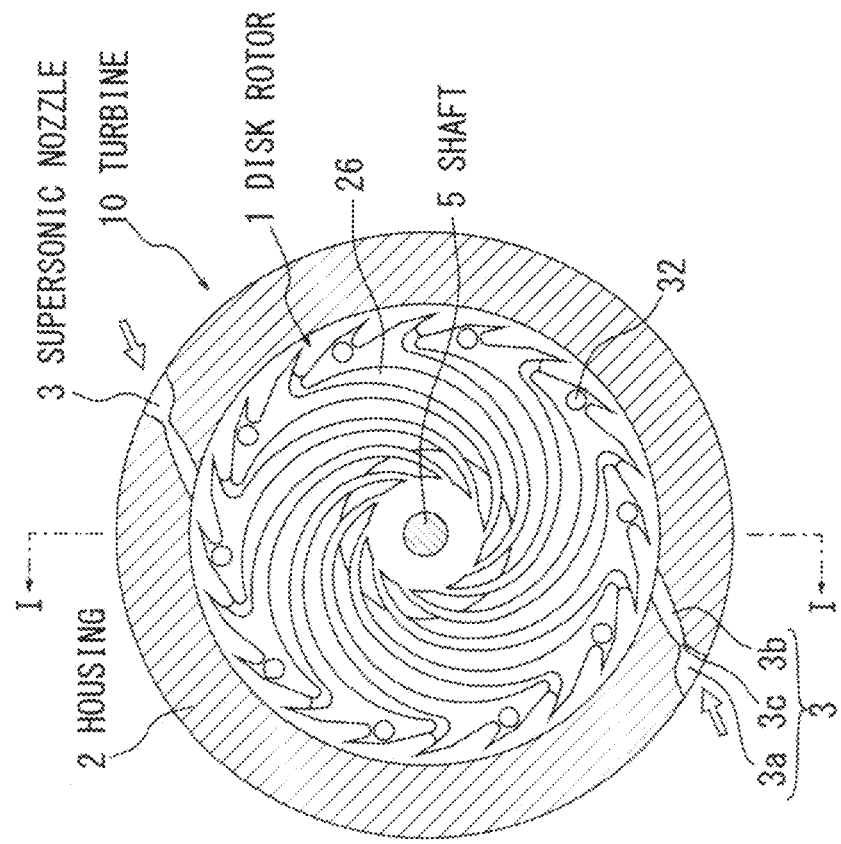
FIG. 2A is a vertical sectional view showing the centrifugal reverse flow disk turbine.
Figure 2C:
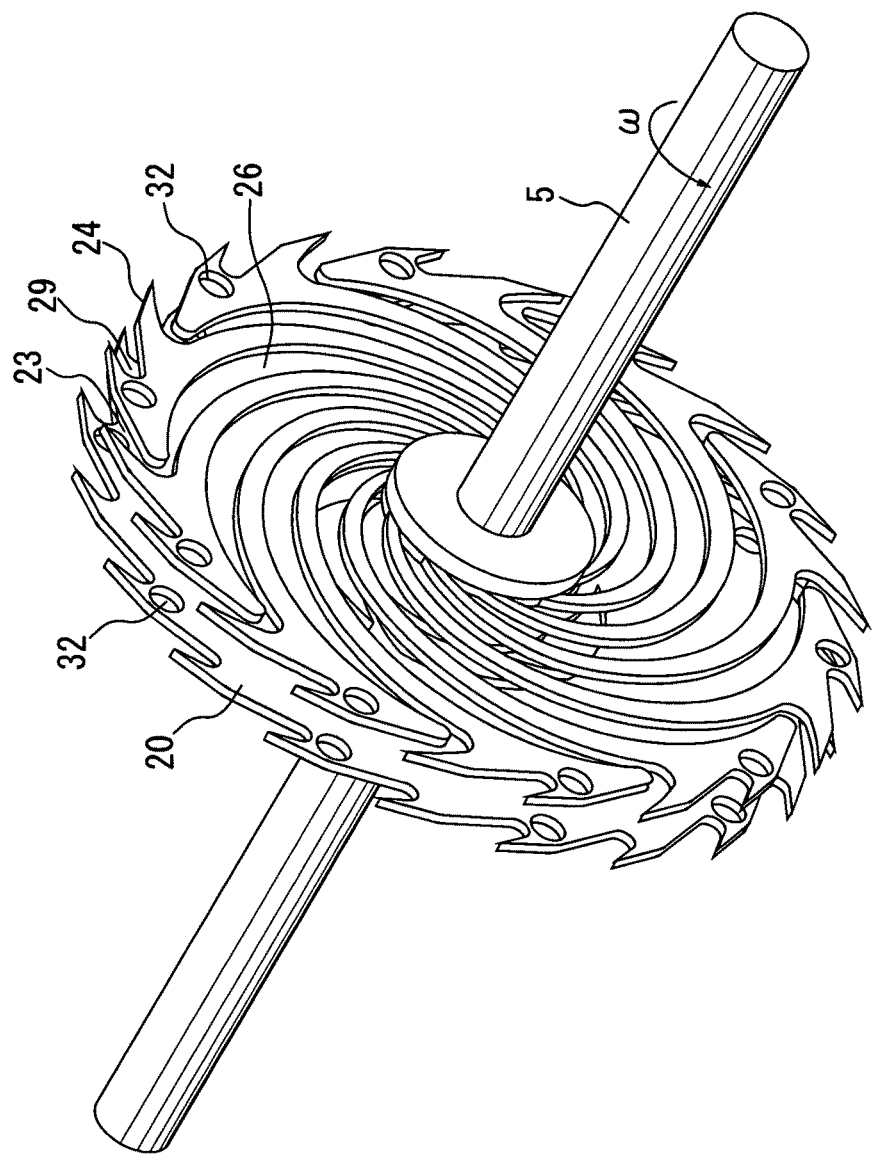
FIG. 2C is an exploded perspective illustration showing the centrifugal reverse flow disk turbine.

In the first embodiment of the present invention as illustrated in FIG. 2A, FIG. 2B and FIG. 2C, the centrifugal reverse flow disk turbine 10 includes a turbine shaft 5, a disk rotor 1 fixed on said turbine shaft 5, and a housing or casing 2 which installs said disk rotor 1 and a plurality of supersonic nozzle 3. Said rotor 1 is placed with rotational-free onto said turbine shaft 5.

Said rotor 1 and said housing 2 is spaced with a prescribed spacing so that the windage loss due to rotation of the rotor 1 could be reduced, preferably spacing is chosen to be 1~3 percent of the rotor radius. In the vicinity of the turbine shaft 5 of said housing 2, there are exhaust port 4. Aforesaid nozzle 3 is preferably the convergent and divergent nozzle (i.e. de Laval nozzle).

Figure 1C:
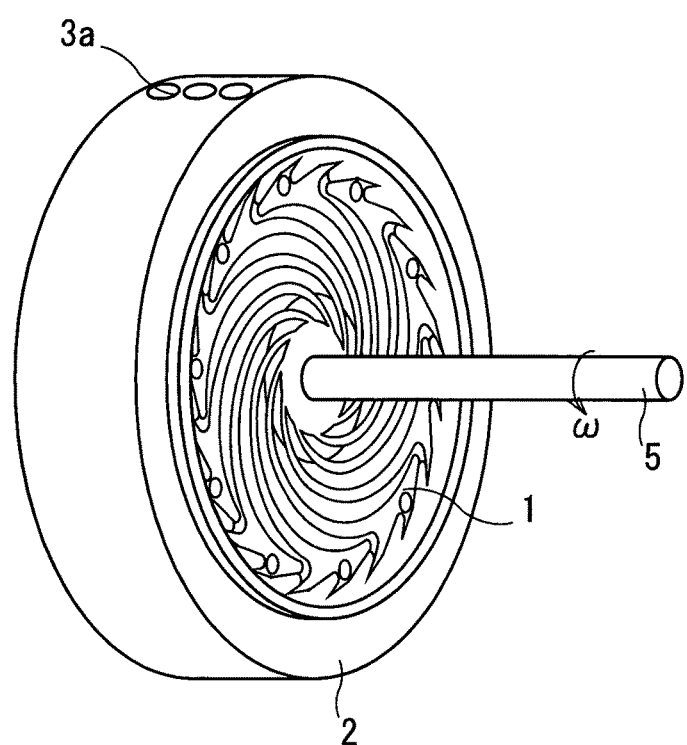
FIG. 1C is a perspective illustration of the turbine.
Figure 1D:
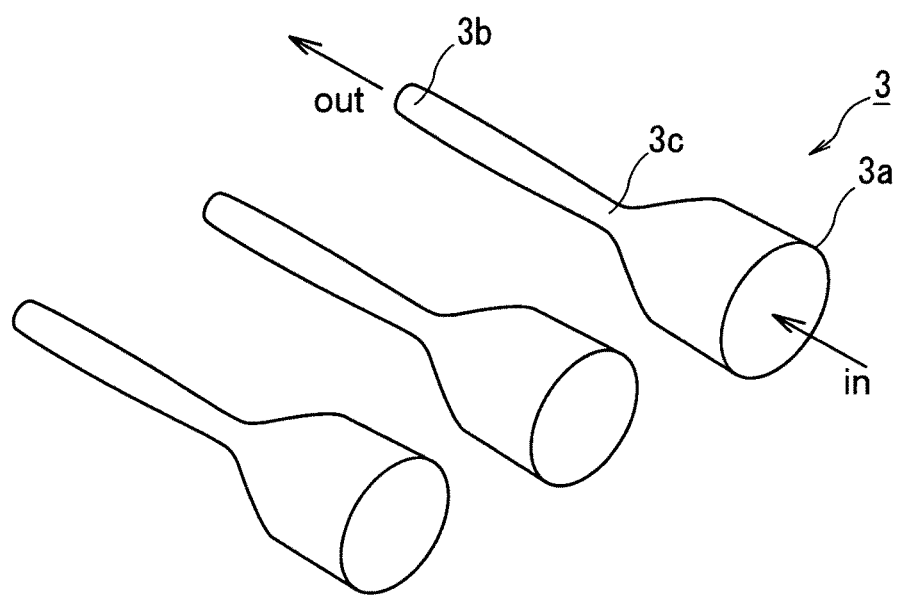
FIG. 1D is an illustration showing an example of an axi symmetric nozzle arrangement.
Figure 1E:
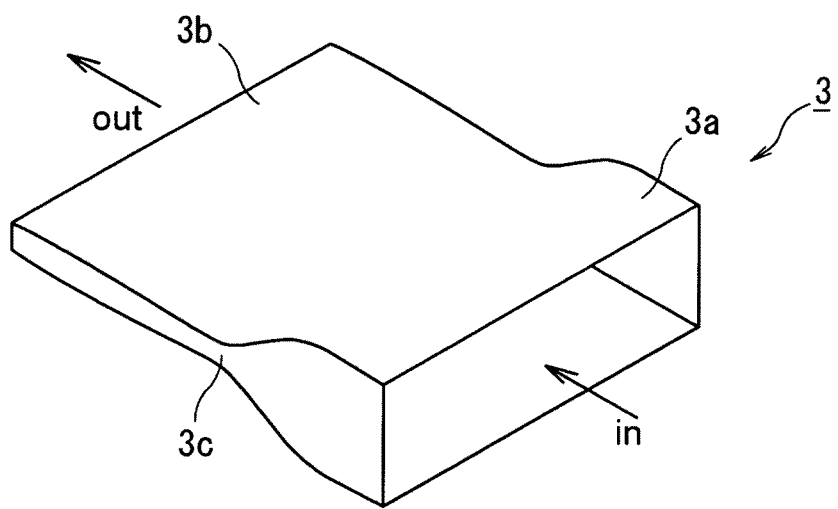
FIG. 1E is an illustration showing an example of a two-dimensional nozzle.

In this embodiment, the nozzle 3 is an axi symmetric nozzle which has a convergent portion 3a, a throat portion 3c and a divergent portion 3b as shown in FIG. 1D. The nozzles 3 may include various geometries and are not limited to the specific shape being shown and may have different shapes. FIG. 1C shows axially-aligned three nozzles 3 of the housing 2. In the case of a larger power (for example, more than 5 kW), a plurality of axially-aligned nozzles 3 or a two-dimensional nozzle 3 is preferably used in the rotor 10. FIG. 1E shows an example of a two-dimensional nozzle.

It should be appreciated that any number of nozzles 3 can be used with the present disclosure, and this number can vary depending on the output power. In this embodiment, there are two nozzles 3 in a circumferential direction as shown in FIG. 2A. Preferably a number of nozzles 3 in the circumferential direction are 4-8, the more the better.

The disk rotor 1, as designated in FIG. 1A, has the flow suction mouth 27, which penetrates in the axial direction and connects with two spaces between the housing 2 and the disk rotor 1. The disk rotor 1 also has a plurality of radial flow channels 26 and these disks and the neighboring spacer disks are laminated together in the axial direction. Aforementioned axial suction mouth 27 can take an arbitrary shape, but it is desirable that the total aperture area should be by far larger than the total inlet area of the radial flow channels.

The disk rotor 1 is comprised of a rib-shaped blade disk with flow channels having two curvatures, radially directed, and axial suction mouths placed near said rotor shaft and two plain spacer disks having buckets (cusps) at peripheral and axial mouths placed near said rotor shaft, and further, a plurality of lamination of disks of above a) and b) in the axial direction. The previous bucket 23 of the radial flow channel 26, preferably, has a nozzle. It is also desirable that small bucket 22 are formed in order to get impulse and reaction forces from supersonic flows out of nozzles attached onto the housing.

In this embodiment, there are forty pairs of blade and spacer disks which forms a rotor 1 in the turbine 10 and there are ten buckets 23 formed on each of the rotors 1. It should be appreciated that any number of rotors 1 and buckets 23 can be used with the present disclosure, and these number can vary depending on the output power. Preferably a number of buckets 23 formed on the rotor 1 are 60-80, the more the better. Also, a number of pairs of blade and spacer disks, which consists rotor 1 in the turbine 10 can be 100-200.

The First Embodiment of the Present Invention

Figure 3A:
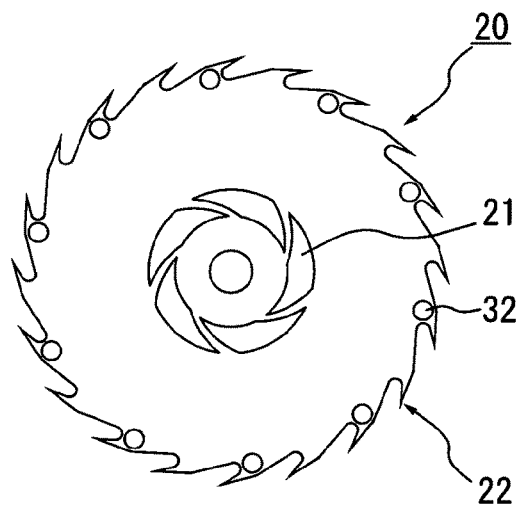
FIG. 3A is an elevational view of a spacer disk which forms the disk rotor of the first embodiment.
Figure 3B:
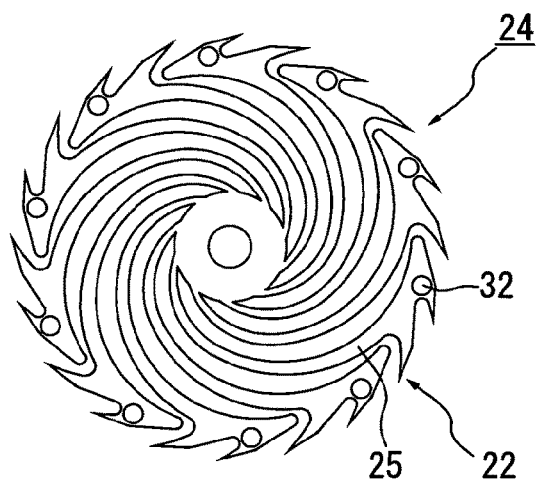
FIG. 3B is an elevational view of a blade disk which forms the disk rotor of the first embodiment.

Said disk rotor 1 in the first embodiment is comprised of a spacer disk 20 shown in FIG. 3A, and a rib-shaped blade disk with flow channels, shown in FIG. 3B, and two kinds of disks are laminated by turns in the axial direction to make a disk rotor. The spacer disk has buckets (cusps) at peripheral and axial mouths placed near said rotor shaft. The blade disk has a plurality of rib-shaped blades 25 and small buckets 22 with the same shape as the one in spacer disk 20.

Figure 3C:
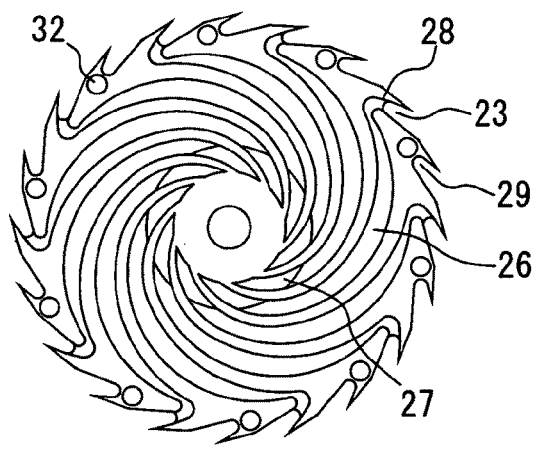
FIG. 3C is an elevational view of an assembled laminate of the blade disc and the spacer disk.
Figure 4A:
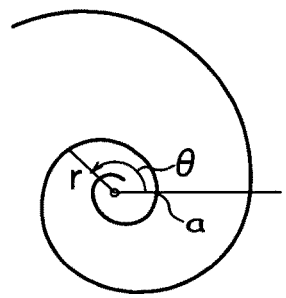
FIG. 4A is an illustration of Logarithmic spiral.
Figure 4B:
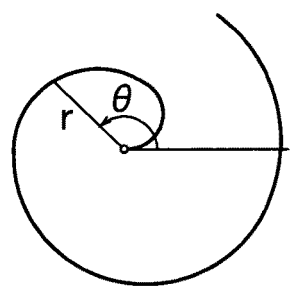
FIG. 4B is an illustration of Archimedes' spiral.
Figure 4C:
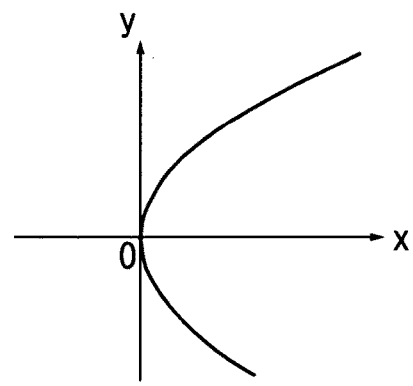
FIG. 4C is an illustration of Parabolic spiral.
Figure 4D:
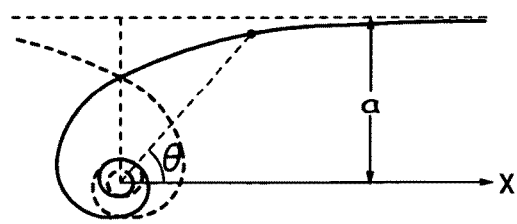
FIG. 4D is an illustration of Hyperbolic spiral.
Figure 4E:
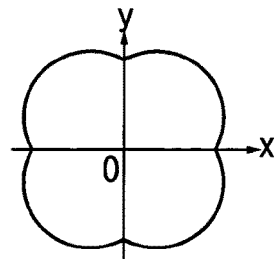
FIG. 4E is an illustration of Epitrochoid.
Figure 4F:
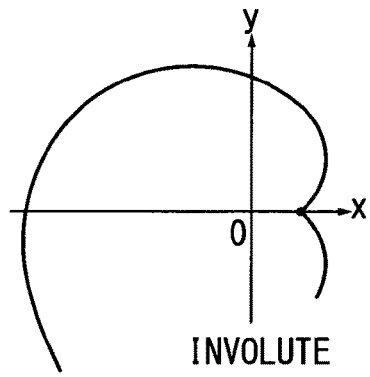
FIG. 4F is an illustration of Involute.
Figure 4G:
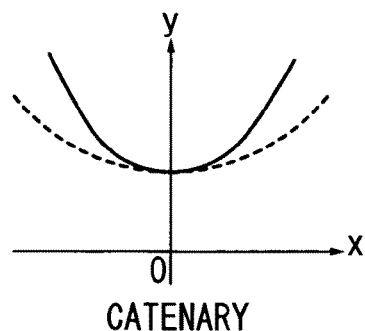
FIG. 4G is an illustration of Catenary.
Figure 4H:
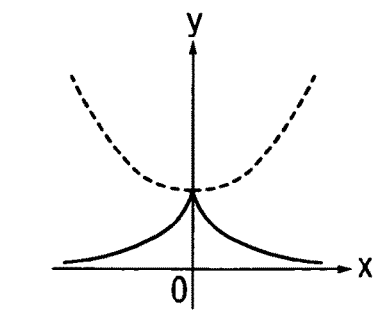
FIG. 4H is an illustration of Involute of Catenary.

As shown in FIG. 3C, by laminating the blade disk and the spacer disk together in the axial direction, the radial flow channel 26 is formed in between two disks. This flow channel has two curvatures; one is located on the way to the second curvature and has a large radius of curvature with a concaved shape to rotational direction, another is located near the tip and having a small radius curvature with a convexed shape to rotational direction.

Axial suction mouths are placed near said rotor shaft for entraining working fluid, and both spacer and blade disks have buckets (cusps) at peripheral so that supersonic jet from the nozzle impinges. There are screw holes 32 to fasten the lamination of the spacer and blade disks. Serrated buckets for receiving supersonic jets from the nozzle 3 are composed by lamination of these disks, as a consequence.

The number N of blade and spacer disks can be determined by using equation (6), for example, so that the friction and entropy losses do not exceed an appropriate value. The extractable power from the invention is strongly dependent upon the rotor diameter, the number of blade and spacer disks, and given flow conditions, including flow rate, pressure, temperature, physical properties of the working fluid used, and the geometry of the housing such as spacing between the disk rotor and the housing, and tip clearance between the rotor tip and the ceiling of the housing.

Geometric configuration of the first curvature of said flow channel of the blade disk is desirable to be the following curves (see FIG. 4A to FIG. 4H);

(a) Logarithmic Spiral;

$$r = ae^{p\theta} (a>0) \quad (8)$$

(b) Archimedes' Spiral;

$$r = a\theta (a>0) \quad (9)$$

(c) Parabolic Spiral;

$$r^2 = a\theta (a>0) \quad (10)$$

(d) Hyperbolic Spiral;

$$r\theta = a (a>0) \quad (11)$$

(e) Epitrochoid;

$$r = 2a(1+\cos\theta)(a>0) \quad (12)$$

(f) Involute;

$$x = (\cos\phi) + \phi \sin\phi$$

$$y = a(\sin\phi - \phi\cos\phi) \quad (13)$$

(g) Catenary;

$$y = a\cosh\frac{x}{a} = \frac{a}{2}\left(e^{\frac{x}{a}} + e^{-\frac{x}{a}}\right) \quad (a>0) \quad (14)$$

(h) Involute of Catenary;

$$x = a\operatorname{arccos}\frac{a}{y} \pm \sqrt{a^2 - y^2} \quad (a>0) \quad (15)$$

Another curve is conceivable smooth and gentle shaped similar one derived from the above mathematical curves. In an example illustrated in FIG. 3C, a logarithmic spiral, with the same flow direction as that of rotation of said rotor, thereby utilizing a friction force (viscous force) formed between a narrow spacing of said blade disk.

The second curvature of the previous flow channel 26, placed in the vicinity of the blade disk tip, is desirable to take a crooked bend in order to yield a momentum change (for example, in FIG. 3C, angle change is about 90 degrees). The number of the blade 25 in FIG. 3C is ten, however, if there is no manufacturing limitation, it is desirable to take as many as possible. There are optimal values for said radii of the spacer disk and the blade disk, numbers thereof, speed of rotation, depending upon given working fluid and various flow conditions at the inlet of the rotor housing. The optimal design can be done using equations prescribed before (see eqs. (1)~(7)).

[Micro-Nozzle Configurations]

As for configuration of micro-nozzle set at the exit of blade disk, the preferable one is a convergent and divergent nozzle (i.e. de Laval nozzle) as in FIG. 5A, but a convergent nozzle or a parallel shaped nozzle will be selected in some cases (in FIG. 5B and FIG. 5C). Of these, the de Laval type nozzle can be utilized only for gaseous fluids.

In particular, in case of the working fluid having a very low kinematic viscosity, such as Chloro Fluoro Carbons (CFCs), Hydro Fluoro Carbons (HFCs), Hydrogenerated Chloro Fluoro Carbons (HCFCs), Hydro Carbons (HCs), and Alcohols, etc., an appropriate thickness of the blade disk (spacing of the flow channel) takes an optimal value of order of micron-, submicron-, and nano-meter.

The material for said spacer and blade disks is preferably made of metal; such as stainless steel, aluminum, titan, and other corrosion-resistant metal alloys. However, in some cases, plastics, fiber reinforced plastic (FRP), ceramics, and heat-resistant glasses. The previous mentioned spacer and blade disks can be manufactured by using a laser processing, discharging processing of electricity, and punching processing, as well.

[Experiment]

In one experiment of the present invention, a typical experiment was performed using one of HFCs as the working fluid for a prescribed condition appropriate for solar applications. The number of blade/spacer disk set is 40, the number of blade (flow channel) for one blade disk 10, diameter 0.1 m, the flow rate 0.0262 kg/s, inlet pressure of nozzle 1.5 MPa, inlet temperature 126 degrees Celsius, and the rotational speed 11800 rpm. In this experiment, twin nozzles are utilized, being secured to the housing with 180° apart.

Figure 6:
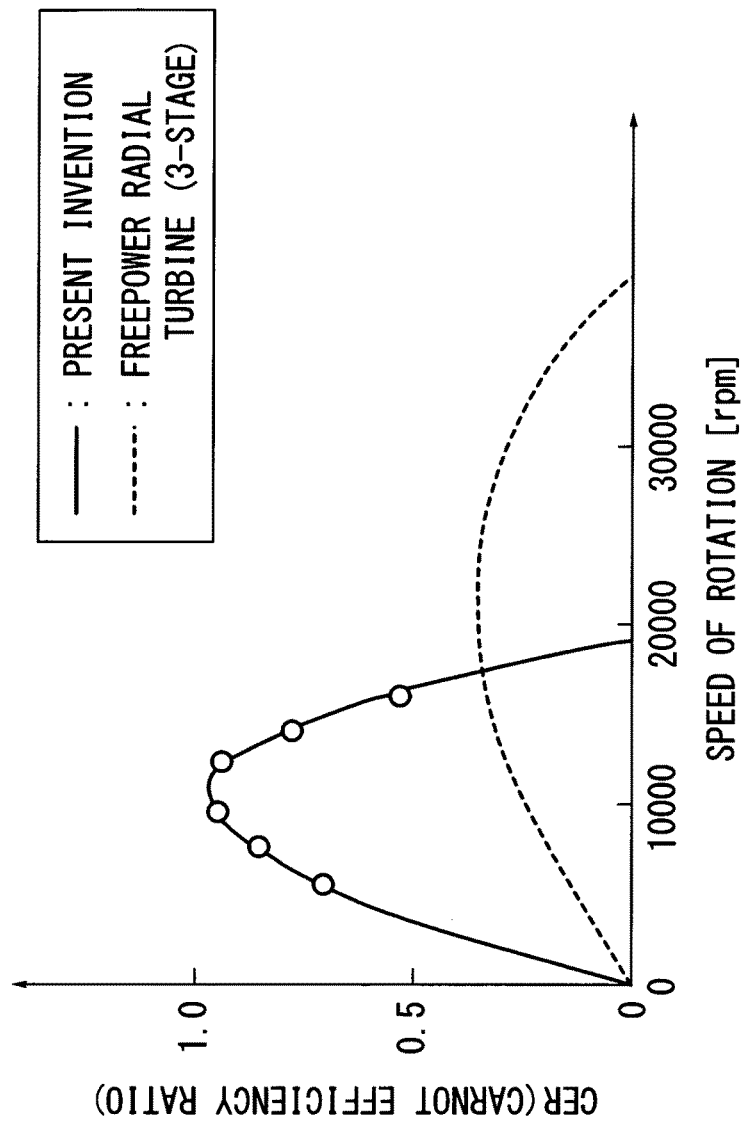
FIG. 6 is a diagram showing the relationship between the Carnot efficiency ratio (CER) and the speed of rotation, for present invention and FreePower radial turbine.

The results of experimental performance is plotted in FIG. 6. The ordinate shows the Carnot efficiency ratio (CER), previously defined, and the abscissa shows the speed of rotation. A peak power is obtained around n=10000~12000 rpm, and it is noteworthy that the CER value of the present invention reaches about 90%.

Also plotted in the figure is an estimated performance curve of conventional radial Rankine cycle turbine (3-stage) manufactured by FreePower Company (UK). By comparison of two results, it is clearly known that the CER value of the present invention is by far superior to the conventional one, thereby validating the present invention.

Figure 7:
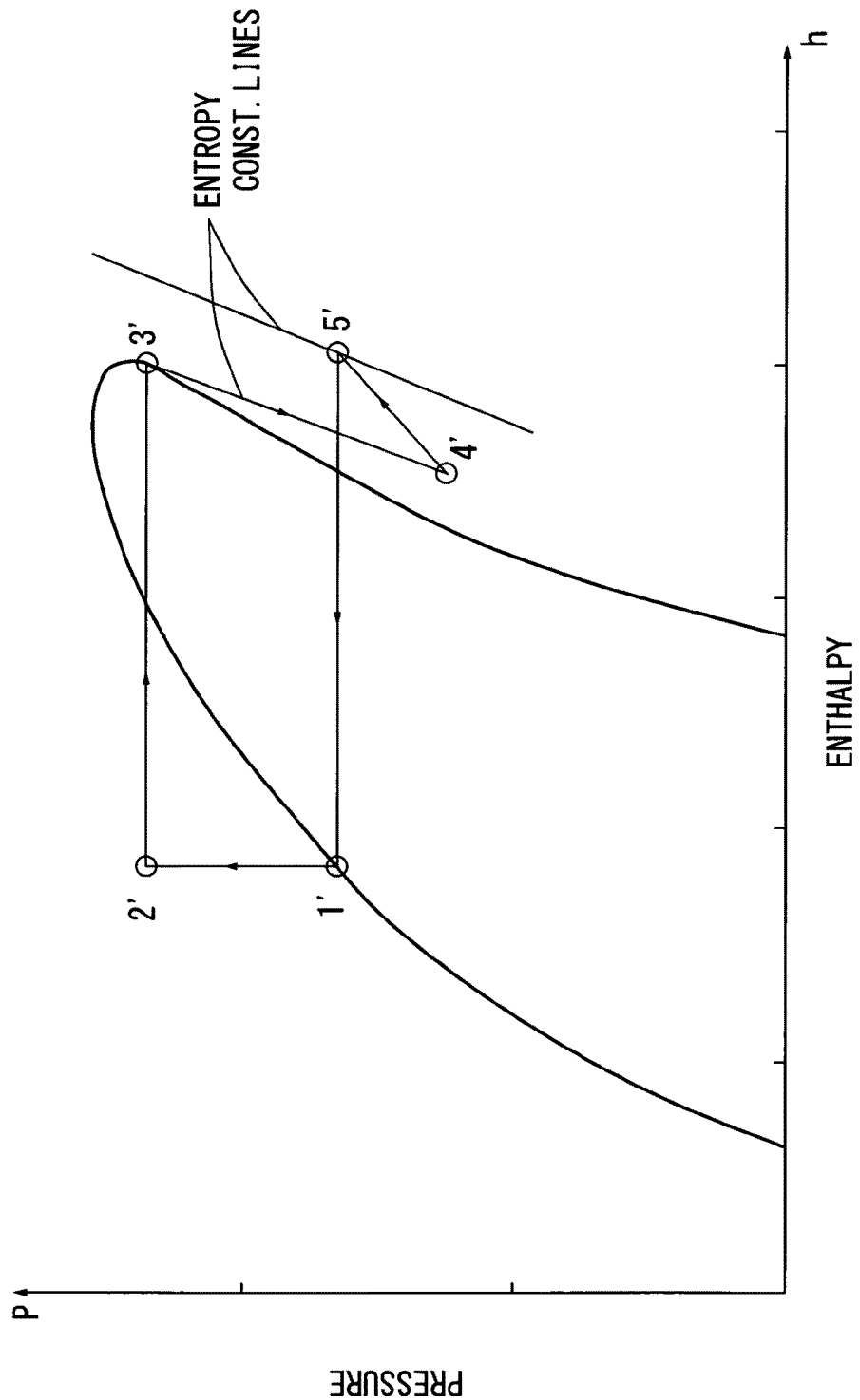
FIG. 7 is a diagram showing the relationship between the pressure and the enthalpy.

Referring now to FIG. 7, there is shown a pressure-enthalpy diagram of the present invention, undergoing organic Rankine cycle. By a circulating pump, the fluid (liquid) at state 1' is pumped to the state 2', then the fluid is evaporated from the state 2' to the state 3', where the maximum enthalpy state is achieved. High pressure and temperature gas is introduced to the nozzles, disposed to the housing, thereby ejecting supersonic flows against the rotor to yield a rotational power.

The exhaust gas is recirculated after reaching the state 4' and entrained through the mouth disposed near the shaft. By a centrifugal force, the entrained fluid is conveyed raidially-outward toward the exit (micro-nozzle), at the same time, the working fluid is heated by the entropy increase due to friction on the walls of the narrow channel, thereby causing an increase of entropy and temperature, as a path from the state 4' to the state 5' shown in FIG. 7. Then, the Rankine cycle is closed by taking a path from the state 5' to the state 1'(original state).

It is especially noted that the recirculating centrifugal flow plays an important role to produce supersonic flows from the micro-nozzles attached to the rotor at the sacrifice of the entropy loss during the state 4' and the state 5', thereby making 400 supersonic flows (in this experiment). This is the most important feature in the present invention.

The Second Embodiment of the Present Invention

The second mode for carrying out the invention is a united or integrated structure including said two spacer disks and one blade disk. This structure is quite different from that of the first mode for carrying out the invention, in which a plurality of spacer and blade disks are alternatively laminated. An entire rotor is combinedly formed by piling up in the axial direction.

The said disk rotor 1 also has a plurality of radial flow channels 26 and the united blade and spacer disks are laminated in the axial direction. Aforementioned axial suction mouth can take an arbitrary shape, but it is desirable that the total aperture area should be by far larger than the total inlet area of the radial flow channels.

Said disk rotor 1 is comprised of lamination of a united hub-and-spoke shaped blade and spacer disk with flow channels having two curvatures, radially directed, and axial suction mouths placed near said rotor shaft and united blade and spacer disks having buckets (cusps) at peripheral and axial mouths placed near said rotor shaft. The previous bucket 23 of the radial flow channel 26, preferably, has a nozzle. It is also desirable that small bucket 22 are formed in order to get impulse and reaction forces from supersonic flows out of nozzles attached onto the housing.

The number N of blade and spacer disks can be determined by using equation (6), for example, so that the friction and entropy losses do not exceed an appropriate value. The extractable power from the invention is strongly dependent upon the rotor diameter, the number of blade and spacer disks, and given flow conditions, including flow rate, pressure, temperature, physical properties of the working fluid used, and the geometry of the housing such as spacing between the disk rotor and the housing, and tip clearance between the rotor tip and the ceiling of the housing. There are optimal values for said radii of the spacer disk and the blade disk, numbers thereof, speed of rotation, depending upon given working fluid and various flow conditions at the inlet of the rotor housing. The optimal design can be done using equations prescribed before (see eq. (1)~(7)).

In particular, in case of the working fluid having a very low kinematic viscosity, such as Chloro Fluoro Carbons (CFCs), Hydro Fluoro Carbons (HFCs), Hydrogenerated Chloro Fluoro Carbons (HCFCs), Hydro Carbons (HCs), and Alcohols, etc., an appropriate thickness of the blade disk (spacing of the flow channel) takes an optimal value of order of micron-, submicron-, and nano-meter.

The material for said spacer and blade disks is preferably made of metal; such as stainless steel, aluminum, titan, and other collision-resistant metal alloys. However, in some cases, plastics, fiber reinforced plastics (FRP), ceramics, and heat-resistant glasses. The previous mentioned spacer and blade disks can be manufactured by using a laser processing, discharging processing of electricity, and punching processing, as well.

[Method to Obtain a Rotational Power]

An impulse force is obtained when the supersonic jet from the nozzle 3 placed on the housing 2, impinges a bucket 22 formed at peripheral of the previous rotor 1, and simultaneously, the supersonic jet reached the bottom 29 of said bucket rebounds in the direction opposite to rotor rotation, thereby making a reaction force.

On the other hand, in case that the rotational speed of the rotor 1 exceeds a threshold value (a tipping point) designated by the previous equation (1), the working fluid flow through channel 26 changes its direction to a radially outward flow, owing to a centrifugal effect exerted by a high rotational speed. As a consequence, this centrifugal flow ejects from the nozzle 28 disposed on the peripheral of the rotor 1, thereby producing a thrust (propulsion force).

Further, a counter flow occurs when this supersonic jet from the nozzle 28 impinges the supersonic jet from the nozzle 3. The resultant counter supersonic flow (CSF) greatly enhances the impulse force. In addition, a rotationally-positive torque is generated due to a viscous effect when the working fluid passes first curvature of flow channel 26. Lastly, the force due to momentum change is yielded when the working fluid passes the second curvature 31, thereby contributing a positive rotational power.

A special notice should be said on the working fluid, since a working fluid with an extremely low kinematic viscosity is strongly recommended for the present invention; for instance, Chloro Fluoro Carbons (CFCs), Hydro Fluoro Carbons (HFCs), Hydrogenerated Chloro Fluoro Carbons (HCFCs), Hydro Carbons (HCs), and Alcohols, and their alternatives.

Most preferable range of kinematic viscosity will be less than about $2 \times 10^{-7}$ m$^2$/s. For example, whereas the kinematic viscosity of water vapor and carbon dioxide ($CO_2$) take $1.2 \times 10^{-5}$ and $1.45 \times 10^{-5}$ m$^2$/s, respectively, at the same temperature of 120 degree Celsius, one of Hydro Fluoro Carbons (HFCs) takes a value $1.3 \times 10^{-7}$ m$^2$/s, this being about two order of magnitude lower than that of water vapor and carbon dioxide.

Selecting a working fluid with a very low kinematic viscosity is of crucial importance, unless otherwise the size of the prime mover becomes large to a great extent. A high-efficient and compact turbine could not be expected at all if the working fluid with high kinematic viscosity were chosen, since enough viscous force, counter supersonic flow, thrust, and increased impulse force are not available. This gives a solution to the reason why the conventional steam turbine of moderate size were inefficient.

Figure 8:
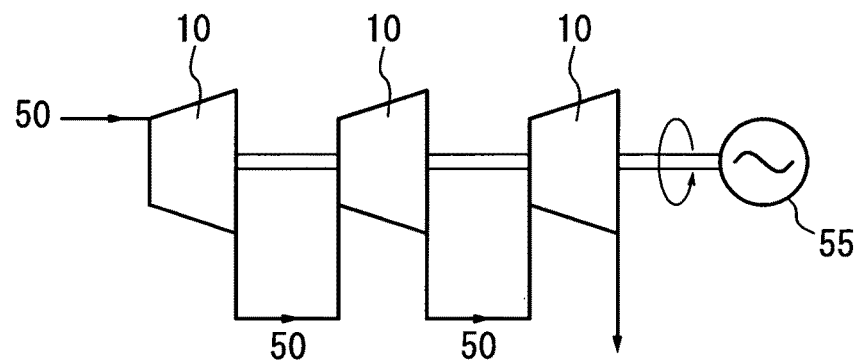
FIG. 8 is a conceptual diagram showing a method to obtain a rotational power (cascading stage).

Above mentioned points are a key factor in the present invention. Energy possessed by the working fluid 50 is further extracted efficiently by placing a plurality of the previous centrifugal reverse flow disk turbine 10 on the same shaft, as shown in FIG. 8. The working fluid passes these turbine units in a cascading manner. Power can be generated by the generator 55 connected co-axially with the rotor shaft. Electric power thus generated is utilized to drive either electric or hybrid vehicle. The shaft power can be also directly connected with compressor to operate air conditioners. Although, in FIG. 8, only a 3-stage disk turbine is designated, however, the stage number can be chosen arbitrarily.

Figure 9:
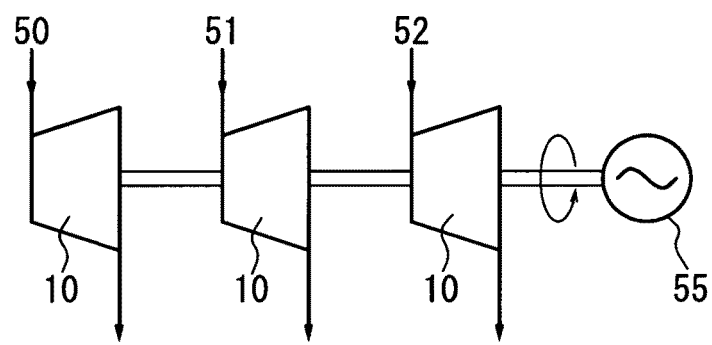
FIG. 9 is a conceptual diagram showing a method to obtain a rotational power (multi-fluid stage).
Figure 10:
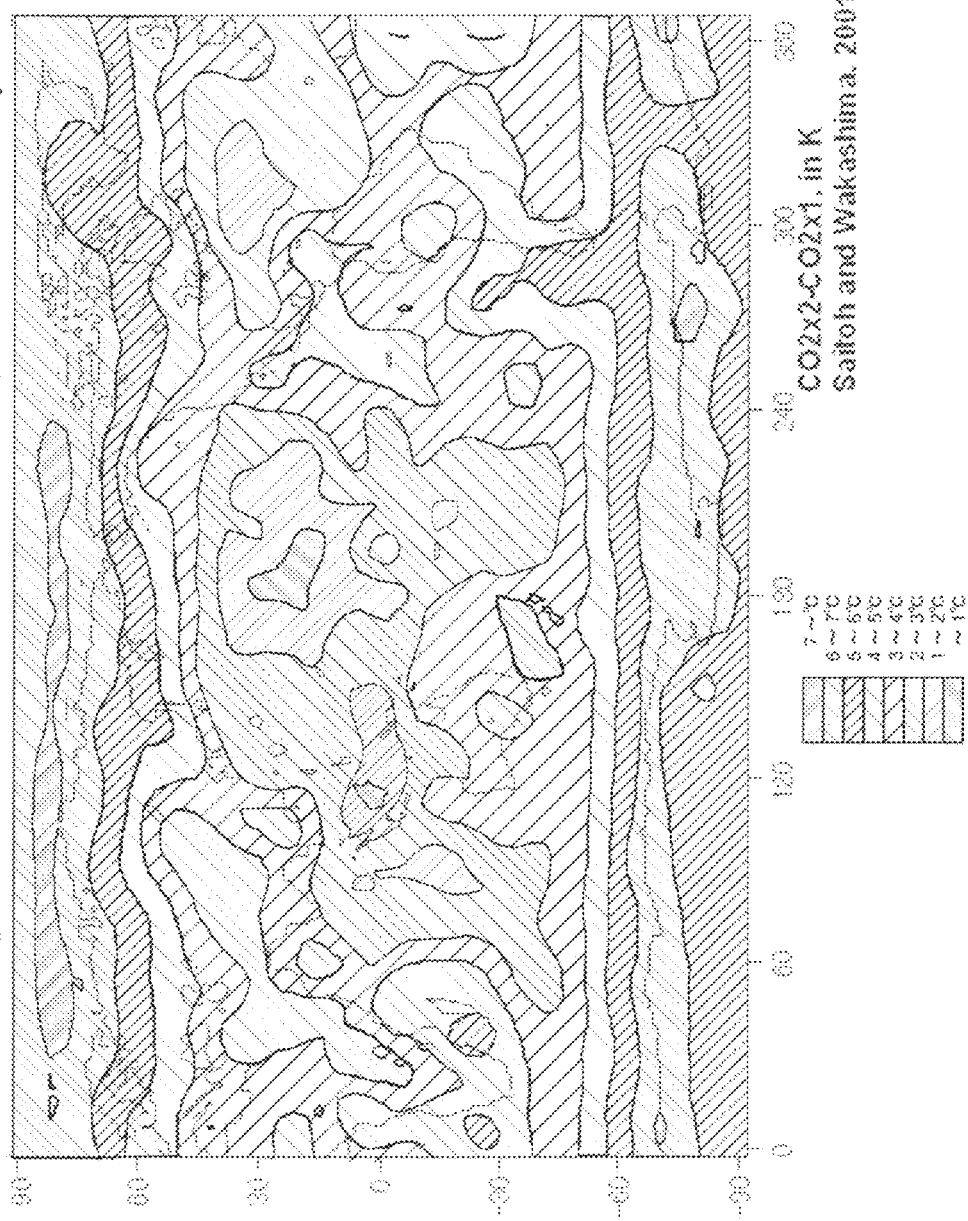
FIG. 10 is a result of global warming simulations, showing earth's surface temperature rise when $CO_2$ concentration is doubled.
Figure 11:
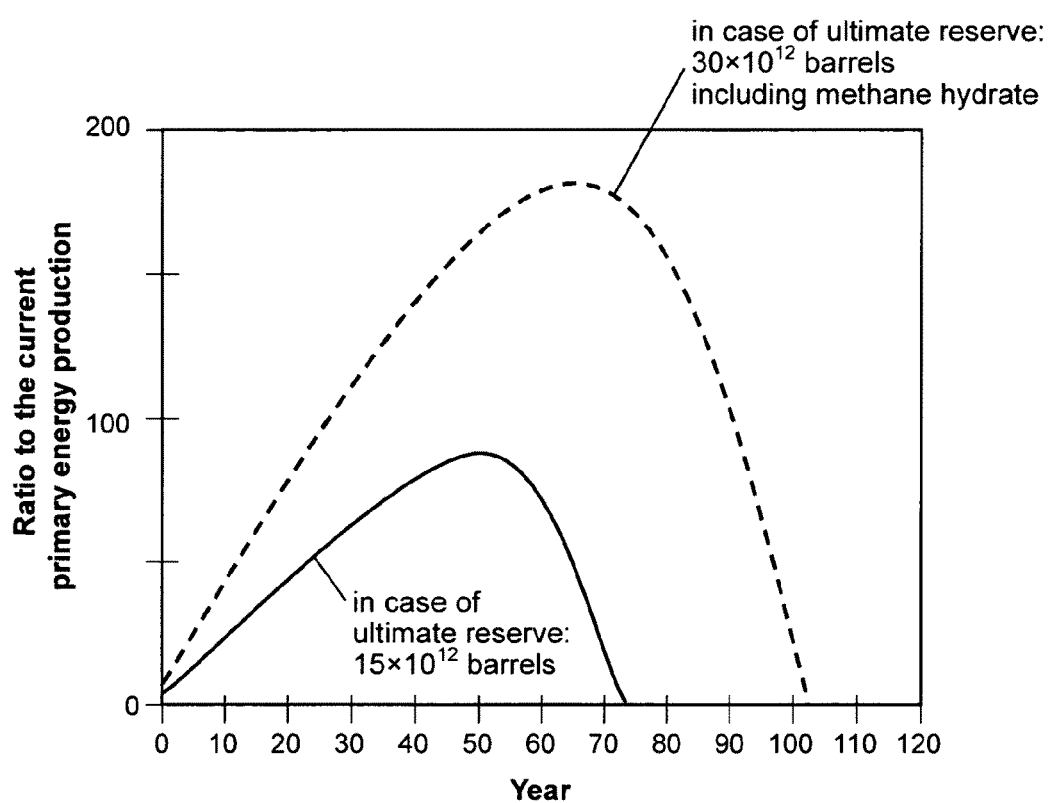
FIG. 11 is a primary energy production for two scenarios. A solid curve is based on the projection by US Geological Survey, and a dotted curve by Saitoh and Wakashima.
Figure 12:
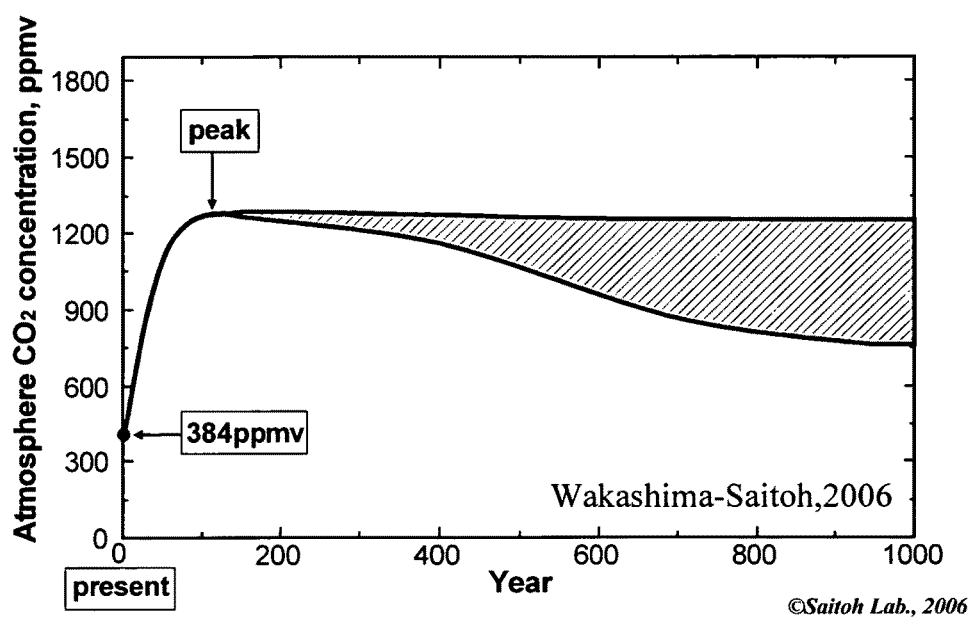
FIG. 12 is a long-term variation of atmospheric $CO_2$ concentration. After taking peak value in 2100, it will stay almost constant. The most probable curve will be upper curve. Lower curve is obtained from the paper that predicts maximum absorption by ocean and land ecosystems.
Figure 13:
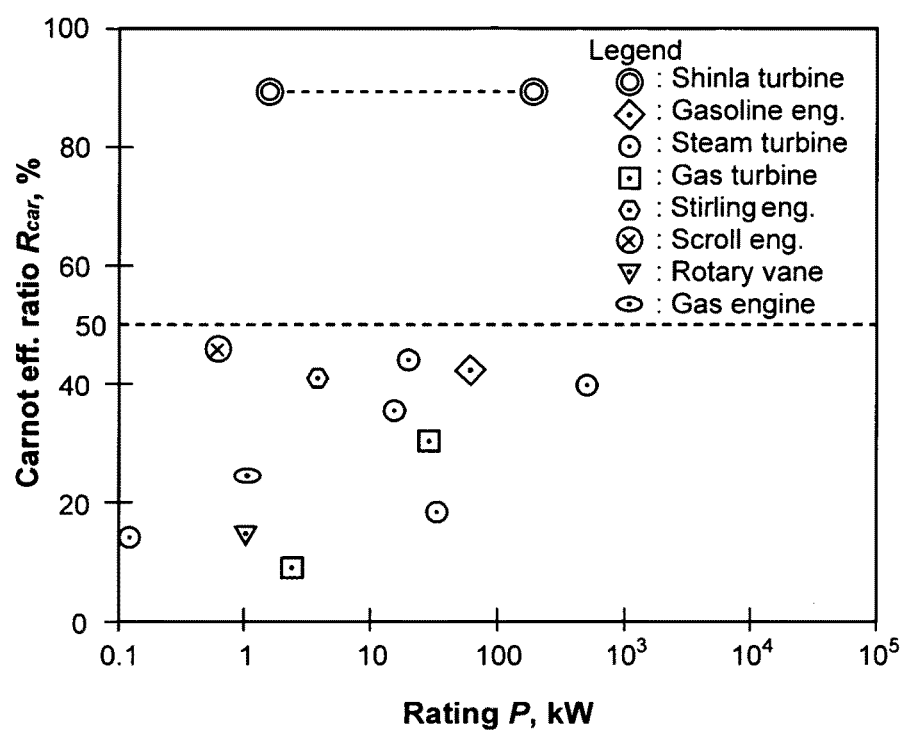
FIG. 13 is a Carnot efficiency ratios for various engines. CER of all of existing engines falls under a line of 50% except present SHINLA turbine.
Figure 14:
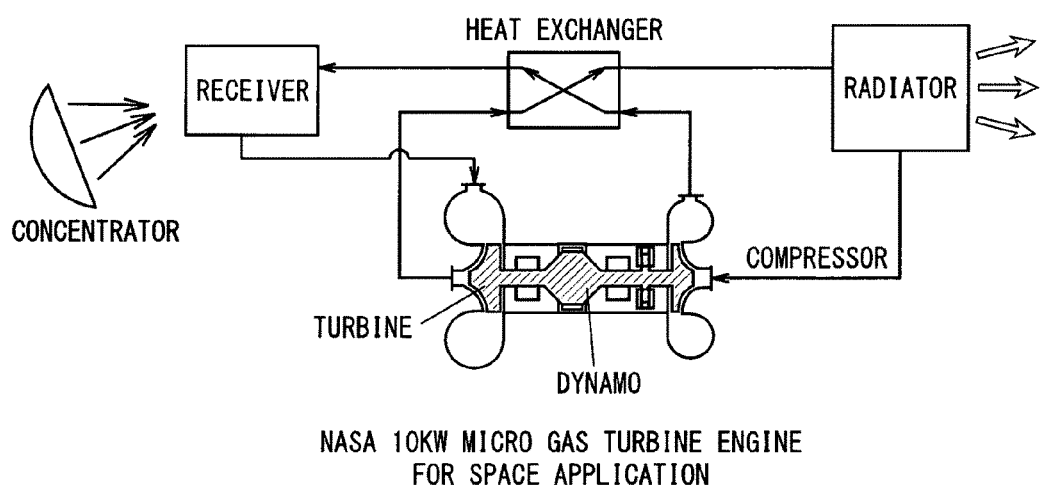
FIG. 14 is a NASA 10 kW micro gas turbine engine for space application.
Figure 15:
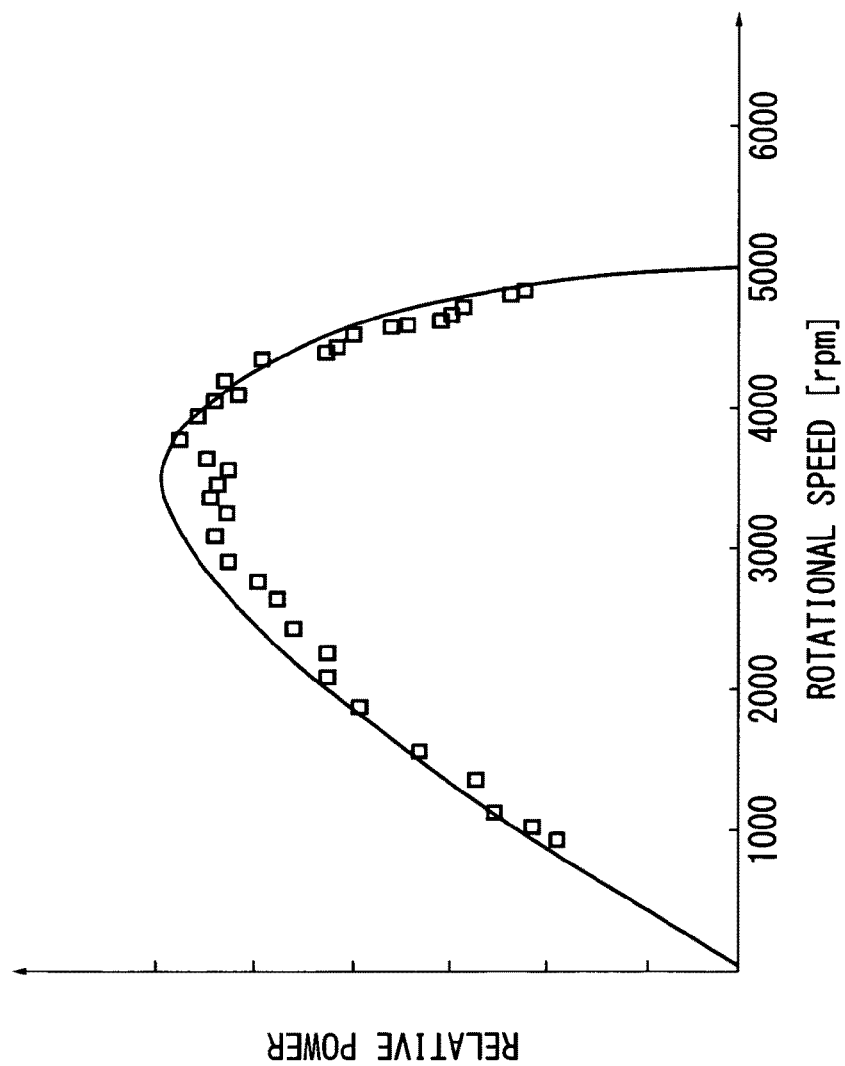
FIG. 15 is a typical experimental result of a disk turbine with reverse direction channel flow, which is different from the present invention.
Figure 16:
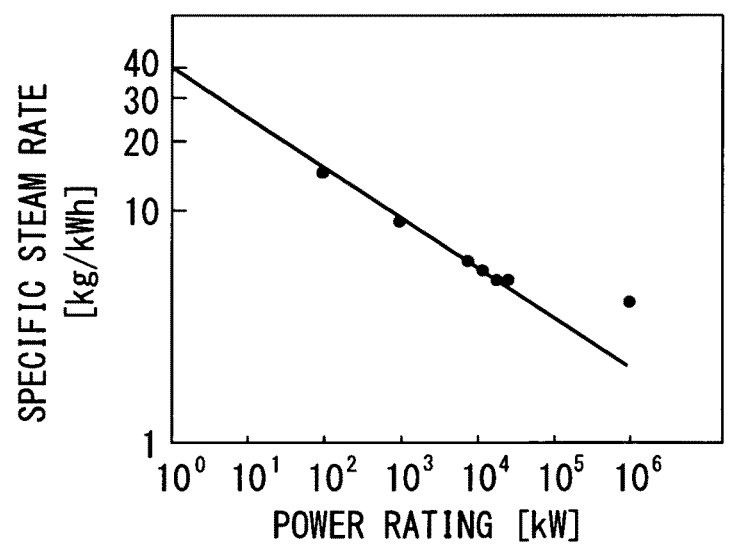
FIG. 16 shows the relation between a power rating and a specific steam rate for a steam turbine in power plants, etc.

It is also possible to extract a rotational power from the multi-stage centrifugal reverse flow turbine as indicated in FIG. 9. In this case, the different working fluids 50, 51, 52 passes the respective unit under the different cycle (multi-fluid cycle). In FIG. 9, only a 3-stage disk turbine is illustrated, however, the stage number can be selected arbitrarily. Moreover, the kind of the working fluid is also taken arbitrarily.

The present invention can be used in various applications such as (1) solar applications, (2) automobiles, aircraft, ship, and railroad applications, (3) space applications, (4) sea water desalination, (5) fuel production, for example hydrogen, ethanol, methanol and biogases, (6) industrial/public welfare applications, (7) steam production, (8) separation/recovery, underground storage, sequestration in deep sea of carbon dioxide, (9) ocean thermal energy conversion and (10) food production and breeding. The total world marketing value will be 59.5 Trillion$.

What is claimed is:

1. A centrifugal reverse flow disk turbine for power generation, the centrifugal reverse flow disk turbine comprising:
   a) a turbine shaft;
   b) a disk rotor disposed on said turbine shaft;
   c) a housing, enclosing said turbine shaft and said disk rotor, bearings, seal devices, and at least one jet nozzle means;
   d) a plurality of channels radially engraved in the disk rotor for transporting a working fluid from entering ports, placed axially near and off said turbine shaft;
   e) the plurality of channels each comprising two curvatures, a first curvature having a large curvature radius, concaved pertinent to a rotational direction of said rotor and extending from the entering port to a middle of its flow path, and a second curvature having a small curvature radius, convexed pertinent to the rotational direction of said rotor and extending from the middle of the flow path to a periphery of said rotor; and
   f) a bucket attached to each of the plurality of channels, directing against said jet nozzle means disposed on said housing, thereby deriving an impinging counter supersonic flow.

2. The centrifugal reverse flow disk turbine according to claim 1, wherein said disk rotor comprises:
   a) an umbrella's rib-shaped blade disk providing a flow channel;
   b) axial holes or mouths for an incoming flow from a recirculating exhaust;
   c) two plain disks, which serve as spacers between said blade disks; and
   d) a plurality of lamination of said blade disk and two neighboring spacer disks.

3. The centrifugal reverse flow disk turbine according to claim 1, wherein said disk rotor comprises:
   a) a rib-shaped blade disk with flow channels having said two curvatures, radially directed, and axial holes placed near said rotor shaft;
   b) two plain disks comprising buckets at the periphery and axial holes placed near said rotor shaft; and
   c) a plurality of lamination of disks of above a) and b) in the axial direction.

4. The centrifugal reverse flow disk turbine according to claim 3, wherein said disk rotor further comprises a plurality of buckets at the periphery exit other than an exit of the flow channel.

5. The centrifugal reverse flow disk turbine according to claim 3, wherein the blade disk comprises jet nozzles at its peripheral exit.

6. The centrifugal reverse flow disk turbine according to claim 3, wherein a multi-stage centrifugal reverse flow disk turbine combines a plurality of radial flow disk turbines, through which the working fluid passes in a cascading manner.

7. The centrifugal reverse flow disk turbine according to claim 3, wherein a system combines a plurality of centrifugal reverse-flow disk turbines using different working fluids, thereby enabling to exploit a wide range of temperature.

8. A prime mover comprising the centrifugal reverse flow disk turbine described in the claim 3, wherein an application is made for an air turbine, a water turbine, a pump, a compressor, a blower, and a windmill.

9. A method for earning rotational power using said centrifugal reverse flow disk turbine described in claim 1, including:
   a) an impulse force coming from impinging supersonic flows from jets out of nozzles disposed on said housing;
   b) a reaction force coming from impinging supersonic flows from jets out of the nozzles disposed on said housing;
   c) a force due to a counter supersonic flow which arises when two jets, one from fixed nozzle disposed on said housing, and another from rotating blade disk rotor, impinge each other at prescribed locations;
   d) a thrust exerted by jet flow from rotating blade disk rotor, which is effective only when nozzle ejection velocity exceeds the peripheral velocity of rotation;
   e) a force due to change of momentum at the second curvature of the flow channel; and
   f) a viscous force produced at both walls in a narrow gap between two plain disks, due to radial and the same directional flow as rotation of rotor.

10. The method for earning rotational power according to claim 9, further including means for realizing effective power satisfying a following equation prescribing the working fluid, rotational conditions, and rotor configurations, $$TS > 2/f(A,R,\beta,\phi) \tag{1}$$

where,
TS: Tesla-Saitoh number=Re/Fe
Re: Reynolds number=$R^2\omega/\nu$
Fe: Flow energy number=$\Delta P/(\mu\omega)$
R: rotor radius
$\Delta P$: pressure difference between at tip clearance and inlet near rotor shaft
$\omega$: angular velocity of rotation
$\nu$: kinematic viscosity of working fluid
$\mu$: viscosity of working fluid A,β,φ: parameters determined by given geometry of flow channel.

11. A turbine structure, comprising:
a rotor mounted on a shaft, the rotor comprising a channel for flowing a working fluid;
a housing for rotationally supporting the shaft to accommodate the rotor in an interior space thereof; and
at least one nozzle for ejecting the working fluid to the interior space of the housing at a supersonic velocity, at least one nozzle being provided on an inner wall of the interior space,
wherein the channel of the rotor comprises a first end portion and a second end portion,
wherein the rotor is rotated at a first predetermined velocity by receiving the working fluid at the first end portion of the channel, so that the working fluid flows through the channel in a first direction from the first end portion to the second end portion, and
wherein the rotor is rotated at a second predetermined velocity higher than the first predetermined velocity by receiving the working fluid from a second end portion of the channel, so that the working fluid flows through the channel in a second direction from the second end portion to the first end portion to produce a counter supersonic flow force.

12. The turbine structure according to claim 11, wherein the channel comprises a curvature portion which is disposed between the first end portion and the second end portion.

13. The turbine structure according to claim 12, wherein the rotor includes a plurality of rotor discs to be assembled, each of which is provided with the plurality of channels.

14. The turbine structure according to claim 13, wherein each of the channels receives the working fluid ejected from the nozzle through a bucket which is formed on an outer periphery of the rotor.

15. The turbine structure according to claim 11, wherein the curvature portion of channel is communicated with the first end portion by a predetermined angle smaller than 90 degrees, so that the curvature portion is extended toward a direction reverse to a rotating direction of the rotor, and is turned to be directed to the first end portion.

16. The turbine structure according to claim 14, wherein the rotor is shaped with a convexo-concave outer periphery, and
wherein the bucket is positioned at each of concave portions of the convexo-concave outer periphery.

17. The turbine structure according to claim 14, wherein the second end portion communicates with axial holes or mouths.

18. The centrifugal reverse flow disk turbine according to claim 1, wherein said disk rotor comprises:
a blade disk providing a flow channel;
axial holes or mouths for an incoming flow from a recirculating exhaust;
spacers between said blade disks; and
a plurality of lamination of said blade disk and two neighboring spacer disks.

19. The centrifugal reverse flow disk turbine according to claim 18, wherein the spacers comprise a plurality of disks.

20. The centrifugal reverse flow disk turbine according to claim 1, wherein said disk rotor comprises:
a blade disk with flow channels having said two curvatures, radially directed, and axial holes placed near said rotor shaft; and
a plurality of disks comprising buckets at the periphery of said rotor and axial holes placed near said rotor shaft.

* * * * *